United States Patent [19]

Noda et al.

[11] Patent Number: 5,052,766

[45] Date of Patent: Oct. 1, 1991

[54] HALOGRAPHIC GRATING AND OPTICAL DEVICE INCORPORATING THE SAME

[75] Inventors: Hideyuki Noda, Ibaraki; Masato Koike, Kyoto, both of Japan

[73] Assignee: Shimadzu Corporation, Kyoto, Japan

[21] Appl. No.: 275,600

[22] Filed: Nov. 23, 1988

Related U.S. Application Data

[63] Continuation-in-part of Ser. No. 940,469, Dec. 11, 1986, abandoned.

[51] Int. Cl.$^5$ .......................... G02B 5/32; G02B 5/18
[52] U.S. Cl. ...................................... 359/15; 359/572; 359/569; 359/900
[58] Field of Search .................. 350/3.7–3.72, 350/162.2, 162.23, ; 356/347, 305

[56] References Cited

U.S. PATENT DOCUMENTS 3,628,849  12/1971  Flamand et al. ...................... 350/37

4,355,858  10/1982  Funato et al. ........................ 350/3.8

FOREIGN PATENT DOCUMENTS

5879207  5/1983  Japan ................................. 350/3.72

*Primary Examiner*—Bruce Y. Arnold
*Assistant Examiner*—David R. Parsons
*Attorney, Agent, or Firm*—Armstrong, Nikaido, Marmelstein, Kubovcik & Murray

[57] ABSTRACT

In formulating a groove pattern for a diffraction grating by means of holography, unique groove patterns are obtained by use of astigmatic coherent beam as either one or two recording beams. Instead of use of only stigmatic beams, and astigmatism in recording light in manufacture of a halographic grating will bring more utilizable parameters in designing groove patterns by which new loci of the type of non-hyperboloidal curves are formed on grating substrates and thereby elimination of abberations which were conventionally difficult are achieved with various optical devices.

8 Claims, 9 Drawing Sheets

Fig. 15

HALOGRAPHIC GRATING AND OPTICAL DEVICE INCORPORATING THE SAME

This application is a continuation-in-part of application Ser. No. 940,469 filed Dec. 11, 1986 now abandoned.

FIELD OF THE INVENTION

This invention relates to a holographic grating which is generally defined as a diffraction grating having a groove pattern produced by holography or by the recording of interferential fringes formed from two coherent light beams onto a photo-sensitive material coated on a grating substrate and an optical device incorporating the same.

DESCRIPTION OF THE RELATED ART

Since development of the holographic grating, many improvements have been proposed in formulating the groove pattern. In the field of a spectrometer incorporating a concave grating, some unique patterns have been proposed to prevent aberrations caused by concave gratings. However, the conventional method of formulating groove patterns has been based on the use of two spherically diverging stigmatic beams which will logically result in the formation of intersectional foci in the nature of a hyperboloid of a revolution on a grating substrate, however further compensation for higher order aberrations was not attained as an aberration of the vertical direction, because the conventional method based on the hyperboloidal pattern only eliminates primary aberrations, such as those of a spherical or coma nature.

Making reference to a plane grating having straight lines in parallel with equal intervals therebetween, such a grating has no aberration of itself, but in applying such to a spectrometer wherein collimators and telemeters are mostly concave mirrors, these concave mirrors are mounted in an off-axis orientation, which will cause aberration. In order to overcome such systematic aberrations, the holographic formation of a groove pattern having non-straight and/or unequal intervals therebetween has come into use. However, the conventional art with the use of spherical beams of a stigmatic nature have been insufficient to eliminate the heretofore recognized aberrations.

SUMMARY OF THE INVENTION

As noted above, in the process of forming a groove pattern on a grating substrate by holography, spherically dispersive beams have been used which have no astigmatic nature in convergence. In contrast, this invention proposes in the above process, at least in 10 either of the two coherent lights for recording the pattern, the use of an astigmatic coherent beam which has two different focal points in a plane defined by a grating center and the direction of travel of principal rays, and also in a plane vertical thereto. Such an astigmatic beam is obtained, for instance, by reflecting a stigmatic spherical beam onto a mirror having a concave surface defined by an ellipsoid of revolution.

In other words, a holographic grating of this invention is featured in having a groove pattern which is formulated by interference fringes of two mutually interferable beams (hereinafter referred to as recording light), wherein either one or both recording lights are of an astigmatic beam having two different convergent points in vertical and horizontal planes in the direction in which the principal rays travel.

Figure 15:
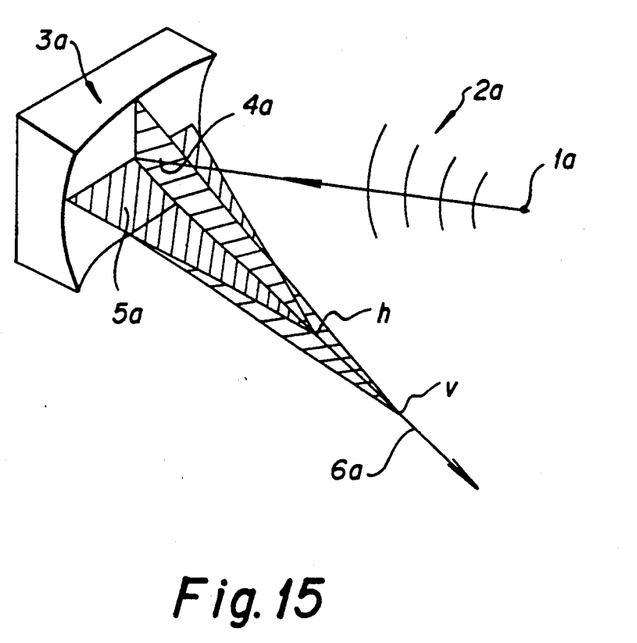

Astigmatism defined in the present invention, noted above, will be further explained with reference to FIG. 15, attached, wherein a point source of light (1a) radiates an isometric spherical beam (stigmatic beam) (2a) defining an incident principal ray, upon reflection from a concave mirror (3a), the beam is converted to be astigmatic light of which sagittal rays (4a) converge at a sagittal (vertical) focal point which will be marked by
and meridional ray (5a) converges at a meridional (horizontal) focal point which will be marked by
wherein these two focal points are separated or not coincident each other in a reflected direction of travel of the principal ray (6a).

In selection of whether an astigmatic beam is used in one or two recording lights, further determination is required of how much difference there is in convergent points between the vertical and horizontal planes, and such determination is of the nature of a choice in design in view of ultimate characteristics desired with a target grating to be manufactured. However, it is held distinctive with any embodiment of this invention that, with the use of astigmatic recording lights, technical parameters in designing a groove pattern are enriched and this increase in degree of choice imparts more abilities to overcome aberrations that have not previously been compensated for.

Namely, stigmatic light having an isometric spherical wave-front is determined by two parameters, i.e., distance from a point source to a grating substrate and an incident angle to it. In contrast, an astigmatic beam has a biaxial converging property for the horizontal (meridional) and the vertical (sagittal) directions, and may come to appropriate to compensate for the aberrations of the vertical direction involved in optical devices. Practically, an astigmatic beam is derived from an off-axis reflection by a spherical mirror, and is defined by parameters due to the distances from the point source of light to the mirror and from the mirror to the grating substrate, the incident angles to the mirror and the grating substrate, and the curvature of the mirror. The new increase in parameters can be utilized in new attempt for compensating remaining aberrations of a higher order involved in optical instruments.

The invention will be hereinbelow explained with reference to drawings attached and further objects and advantages of the invention be apparent in the following.

BRIEF DESCRIPTION OF THE DRAWINGS

Here the radius of curvature of the spherical grating substrate is unit length.

These drawings will be grouped in the following for convenience in description. Specifically, FIGS. 1, 2, 3, 4 and 5 will be included in Group 1 and FIGS. 6 and 7 will be in Group 2 and FIGS. 8, 9, 10, 11 and 12 will be in Group 3, and FIGS. 13 and 14 will be in Group 4.

It is to be noted here that all drawings are schematic and are not to scale, but they are designed to be useful to explain the invention as compared with related art and that these drawings are presented by way of illustrating specific embodiments. Therefore, the attached drawings should not be construed as limiting the present invention.

DETAILED DESCRIPTION OF THE PREFERRED EMBODIMENTS

Group 1

Embodiment 1

Figure 1:
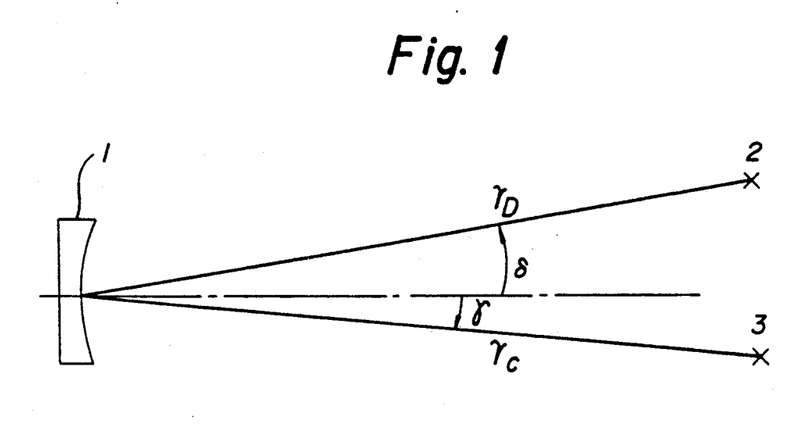
FIG. 1 shows a plan view of a conventional system for recording a groove pattern onto a grating substrate.

FIG. 1 illustrates a process for the manufacture of a grating by a conventional method or a system of recording a groove pattern on a spherical grating by the conventional method, wherein a grating 1 is coated with a photo-sensitive material to be finished to become a diffraction grating and point sources 2, 3 emanate coherent laser light in spherical wave. This spherical beaming records, as noted hereinbefore, on the substrate the interference fringes formed by the intersection of two hyperboloids.

The laser light used has a wavelength of 441.6 nm and other parameters are noted below:

| $r_c = 0.9896,$ | $\gamma = -4.764°$ |
|---|---|
| $r_d = 0.9908,$ | $\delta = 10.101°$ |

Here the radius of curvature of the spherical grating substrate is unit length.

Embodiment 2

Figure 2:
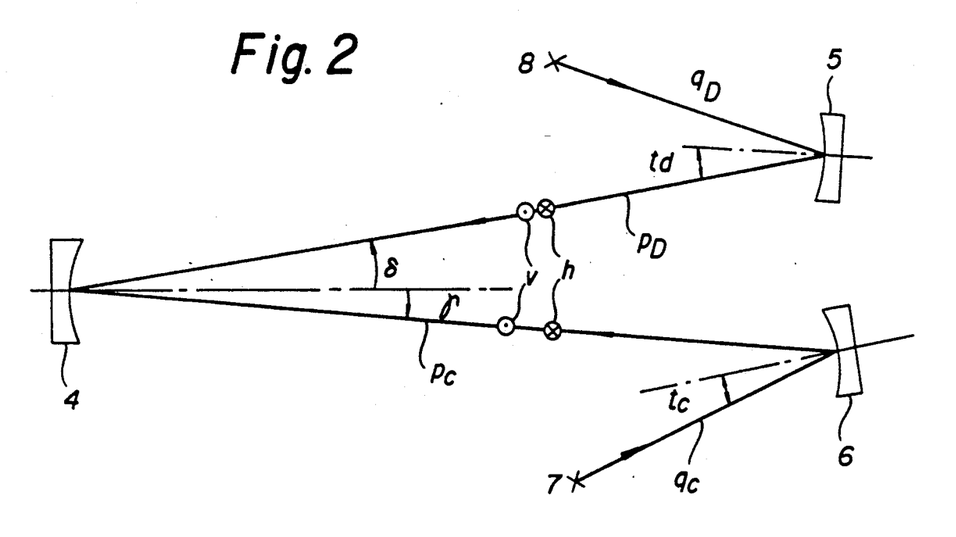
FIG. 2 shows a plan view of an inventive system for recording a groove pattern onto a grating substrate.

FIG. 2 illustrates a recording system of this invention to formulate a groove pattern wherein the vertical focus of the spectrum crosses or cuts with the horizontal focus of the spectrum on their midways (note a mark "m" in FIG. 4) and wherein 4 is a spherically concave grating substrate and 5 is a spherical mirror having radius of curvature=0.6132, and 6 is a toroidal mirror having two radiuses of 0.6132 horizontal and 0.5852 vertical, and 7, 8 are laser light points emanating stigmatic beams. Other recording parameters are given with use of a 441.6 nm laser:

| $p_C = 1.5819,$ | $q_C = 0.5923,$ | $\tau_C = 15.000°$ (degrees) |
|---|---|---|
| $p_D = 1.5831,$ | $q_D = 0.5923$ | $\tau_D = 15.000°$ |
| $\gamma = -4.764°$ | $\delta = 10.101°$ | |

Further wherein and indicate horizontal and vertical focal points of laser beams by the mirrors 5, 6. The fact of separated locations of and proves that initial stigmatic beams are converted to be astigmatic by reflection on the mirrors 5 and 6. Here, the radius of curvature of the grating substrate 4 is unit length.

Embodiment 3

Figure 3:
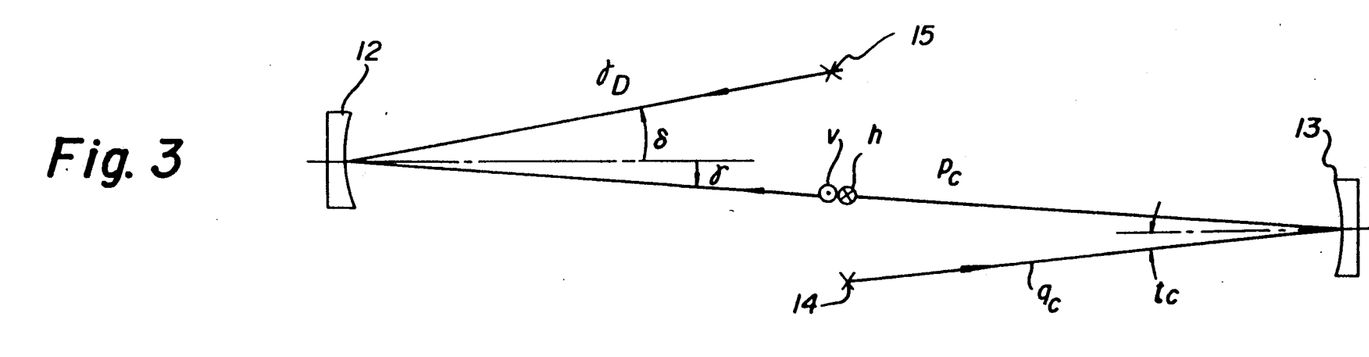
FIG. 3 shows a plan view of another inventive system for recording a groove pattern onto a grating substrate.
Figure 4:
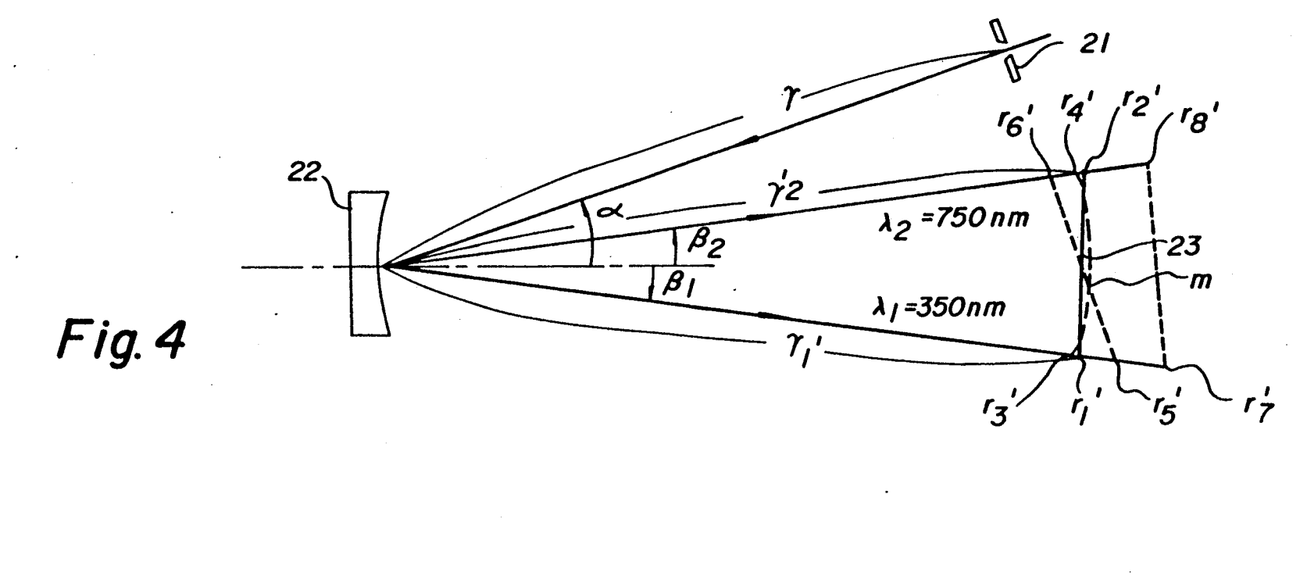
FIG. 4 illustrates light passages in a spectrometer to show arrangements including a grating, incident light, and locations of resultant foci of spectrums.

FIG. 3 illustrates a recording system for a toroidal grating (note that FIG. 2 is the case of a spherically concave grating, in contrast) to have substantially equal horizontal and vertical foci, as will be noted in FIG. 4, of which locations are coincided with the horizontal focus of the grating manufactured in the system of FIG. 2. And wherein, in FIG. 3, 12 is a toroidal grating substrate having two radii of 1.000 horizontal and 0.944 vertical, 13 is a spherical mirror having a radius of curvature=1.000, and 14, 15 are laser light point sources to emanate spherical beams of 441.6 nm. Other particular parameters are:

| $p_C = 1.9854$ | $q_C = 0.9957$ | $\tau_C = 5.288°$ |
|---|---|---|
| $r_D = 0.9908$ | $\gamma = -4.764°$ | $\delta = 10.134°$ |

Further, h and v indicate horizontal and vertical focal points of the beam from the laser source 14 after reflection on the mirror 13.

Embodiment 4

FIG. 4 is intended to show how locations of foci of spectrums in a spectrometer will change according to the choice of a concave grating which is an alternative of an inventive or a conventional grating, wherein 21 is an entrance slit and 22 is the spherical or toroidal grating to be evaluated, and 23 is a photographic plate or array detector which is assumed to be positioned to attain minimum departure from the foci of spectrums under the wave range of 350 nm ($\lambda_1$) to 750 nm ($\lambda_2$), and further parameters involved are:

| $r = 0.9514,$ | $r_6' = 0.9707$ |
|---|---|
| $r_1' = 1.0035,$ | $r_7' = 1.1101$ |
| $r_2' = 1.0104,$ | $r_8' = 1.0979$ |
| $r_3' = 0.9953,$ | $\alpha = 19.268°$ (degree) |
| $r_4' = 1.0092,$ | $\beta_2 = -7.164°$ |
| $r_5' = 1.0504,$ | $\beta_2 = 6.309°$ | and radius of horizontal curvature (in the case of toroidal, approximate value) of the grating is 1.000, as the unit of length.

It is to be noted here that three broken lines noted in FIG. 4 indicate, as annotated, horizontal and vertical focal curves wherein three horizontal curves of the gratings by FIGS. 1, 2 and 3 are superposed on each other, on which a vertical one by FIG. 3 is also superimposed, two vertical curves by FIGS. 1 and 2 are separated.

Embodiment 5

This embodiment is intended to show results of comparative evaluation of inventive and conventional gratings in terms of elimination of aberrations.

Figure 5A:
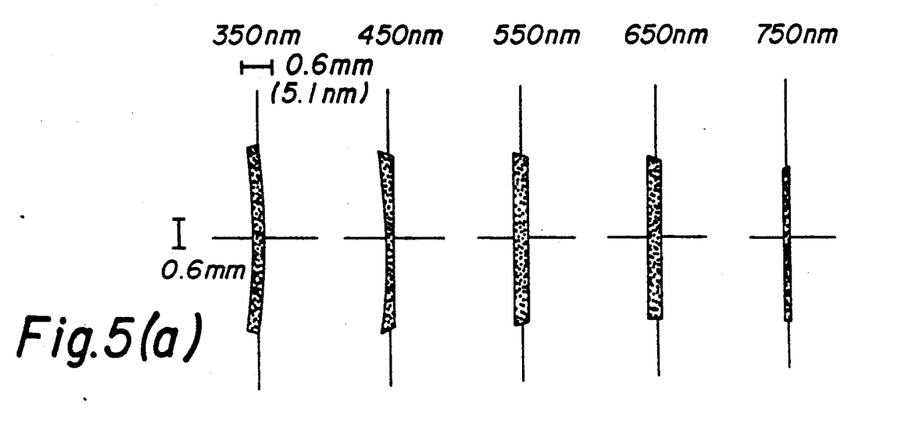
FIG. 5 illustrates results of eliminating aberrations in respect to the inventive gratings as compared with conventional ones.
Figure 5B:
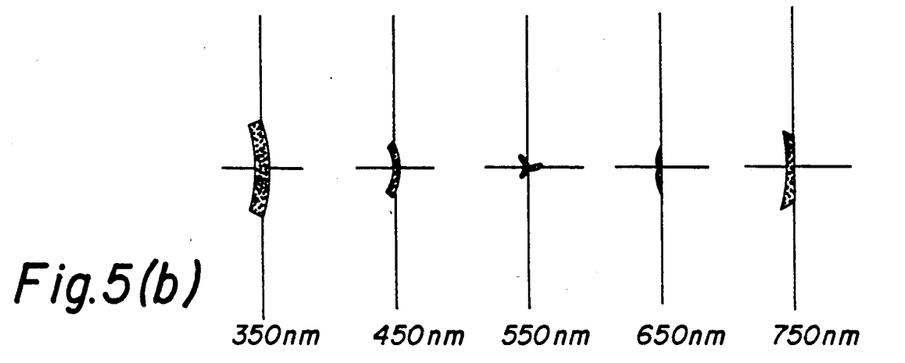
Figure 5C:
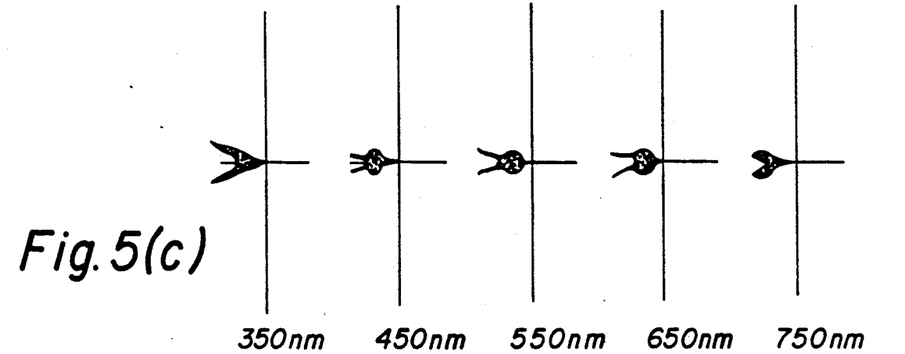

FIG. 5 illustrates to what extent aberrations were observed in experiments with use of the spectrometer shown in FIG. 4, wherein monochromatic lights having different wavelengths were introduced at the center of the entrance slit and received at the position of the image plane noted in FIG. 4 and wherein the gratings used have the same radius of curvature=200 mm and the same area of 40×40 mm² manufactured in different recording systems shown; in FIG. 1 (conventional), FIG. 2 (inventive example I) and FIG. 3 (inventive example II).

Accordingly, schematic drawings of series (a) relate to results obtained of the grating by FIG. 1, and series (b) relate to results by FIG. 2, and in the same way, series (c) relate to results by FIG. 3, wherein results observed in the inventive series of (b) and (c) prove definite superiority over the conventional (a) in elimination of vertical aberrations.

In above embodiments concerning the manufacture of gratings, conversion of stigmatic to astigmatic wave for the recording were performed by a toroidal mirror or a spherical mirror in off-axis orientation (in other words, the off-axis orientation results from projecting a substantially non-paraxial light beam onto an optical surface), but other available similar arrangements are mirrors of cylindrical and ellipsoidal shape and lenses of toroidal, spherical or cylindrical shape and further available are optical elements of which one side lens surface is metallically coated.

Group 2

Embodiment 6

Figure 6:
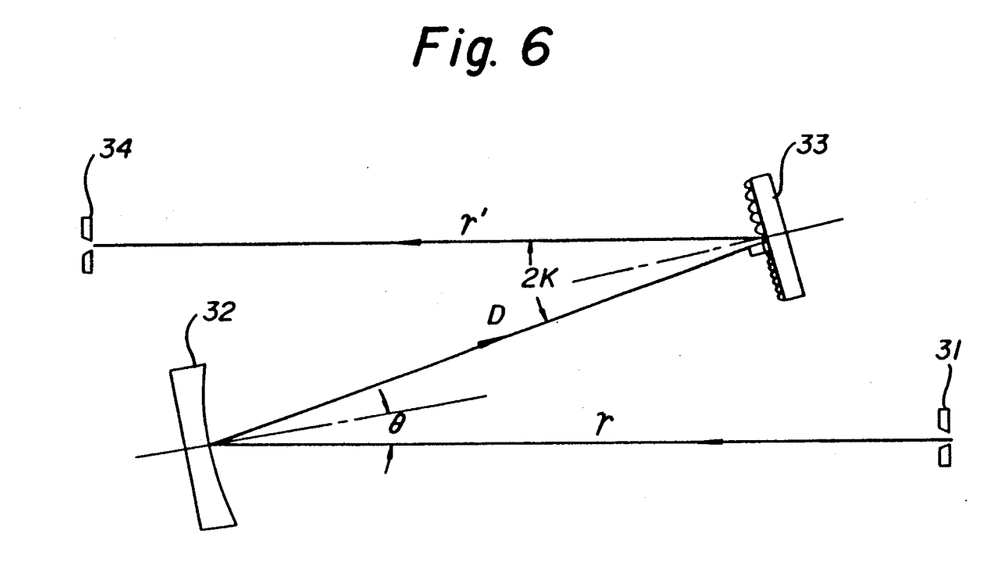
FIG. 6 shows a plan view of a spectrometer incorporating an inventive grating.

FIG. 6 illustrates a spectrometer incorporating a flat grating of the invention wherein 31 is an entrance slit, 32 is a concave mirror, 33 is an inventive grating and 34 is an exit slit, and wherein these elements are assumed to be positioned to have minimum departure from the horizontal focal point in wave length of 300 to 900 nm, and further wherein it is assumed that the concave mirror 32 has a radius of curvature=1.000 (as the unit of length) and the grating 33 has a grating constant=1/1200 mm, of which application order being first order, other parameters are given below:

| | | |
|---|---|---|
| r = 0.7755, | D = 0.6204, | r' = 0.7064 |
| θ = 10° (degrees), | 2K = 20° | |

Embodiment 7

Figure 7:
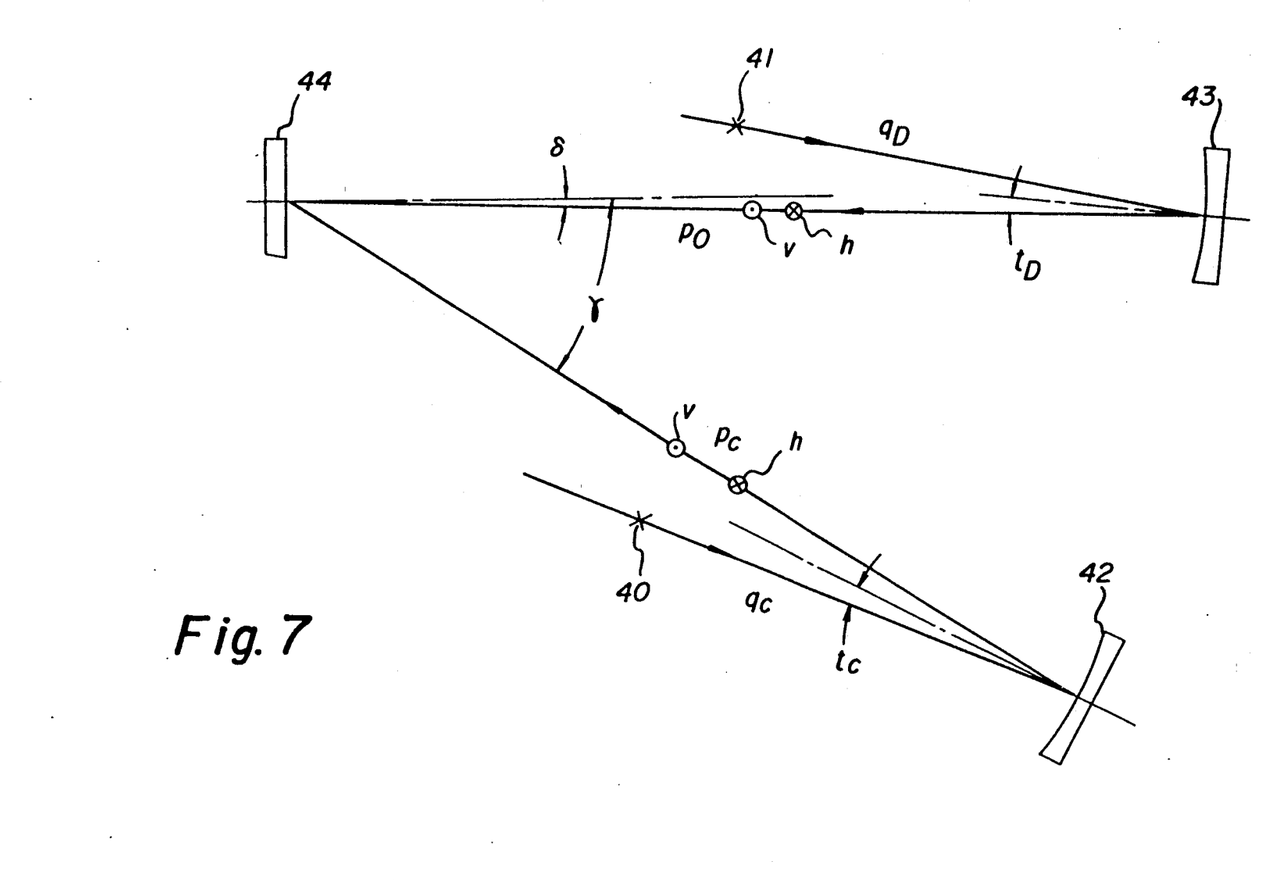
FIG. 7 shows a plan view of still another inventive system for recording a groove pattern onto a grating substrate.

Shown in FIG. 7 is a recording system to manufacture an inventive flat grating wherein 44 is a flat grating substrate, 40, 41 are recording beam sources, 42 is a spherical mirror having a radius of curvature=1.000 (as the unit of length), 43 is a toroidal mirror having horizontal radius of curvature=1.0000 and vertical radius thereof=0.9388. Other particular parameters are given with use of laser having a 441.6 nm wavelength;

| | | |
|---|---|---|
| $p_C$ = 1.9724, | $q_C$ = 0.9767, | $\tau_C$ = 5.121° |
| $p_D$ = 2.0799, | $q_D$ = 0.9879, | $\tau_D$ = 4.956° |

-continued

| | |
|---|---|
| γ = 33.438°, | δ = 1.210° |

Further, two pairs of (h) and (v) indicate horizontal and vertical focal points produced by the mirrors 42, 43 in the same function as noted hereinbefore.

In this embodiment, two reflector mirrors 42, 43 are concave, but such is not requisite condition. In place, the use of the concave mirrors in either position may be accepted, and further a grating substrate can be of a cylindrical shape rather than being flat.

Group 3

Embodiment 8

Figure 8:
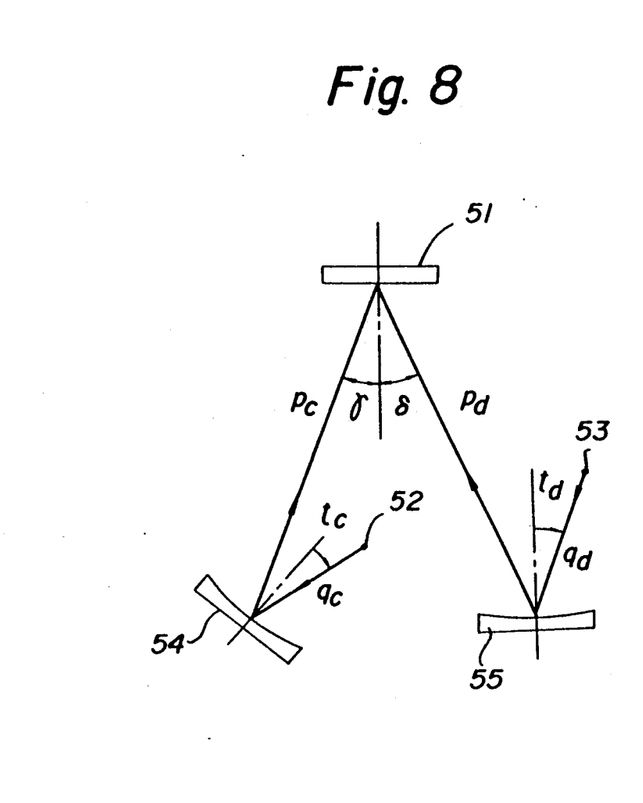
FIG. 8 shows a plan view of still further another inventive system for recording a groove pattern onto a grating substrate.

This embodiment relates to a plane grating of the invention with reference to the manufacture thereof shown in FIG. 8 and a Czerny-Turner mount spectroscopy (FIG. 9) with use of the grating manufactured by the process shown in FIG. 8.

In the case of FIG. 8, two recording lights 52, 53 obtained by dividing the same one laser beam (not shown) and by convergence are interfered onto a grating substrate 51, wherein on their way the two beams are respectively reflected on concave mirrors 54, 55 to become non-spherical light.

Figure 9:
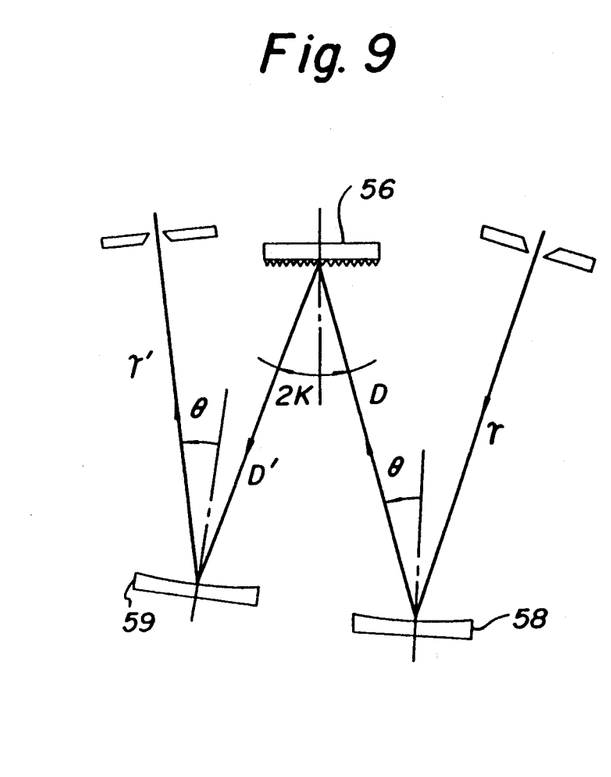
FIG. 9 and FIG. 10 show plan views of spectrometers incorporating inventive gratings.

In the system of FIG. 9, following parameters are used: wave length is 300 nm to 800 nm and grating constant at the center of grating 56 is 1/1600 mm and a collimator 58 is assumed to be a spherical mirror having unit radius length of curvature.

Other parameters in connection with FIG. 8 or manufacture of the grating are noted as below: the recording laser source is a 441.6 nm laser and exposure parameters are;

| | |
|---|---|
| $p_C$ = 0.9898 | $p_d$ = 0.9896 |
| $q_C$ = 0.3915 | $p_d$ = 0.3907 |
| α = 20.688° | δ = 20.688° |
| $\tau_C$ = 14.38° | $\tau_d$ = 15.64° | and the radius of curvature of the mirrors 54, 55 (R4, R5) are the same or R4=R5=1.000.

Other parameters in connection with FIG. 9 or spectroscopic system as noted as below:

r=0.4977,  D=0.4298,  D'=0.4325,  r'=0.4925,
Θ=5.53°, K=29.12°, Θ'=13.44°, and application order m=−1, radius of curvature (R9) of the camera mirror 59 is; R9=1.013. Accordingly, $p_c$, $q_d$ and radii of curvature of the concave mirrors 54, 55 are equal to the radius of curvature of the collimator 58 or in proximity thereof.

Embodiment 9

Figure 10:
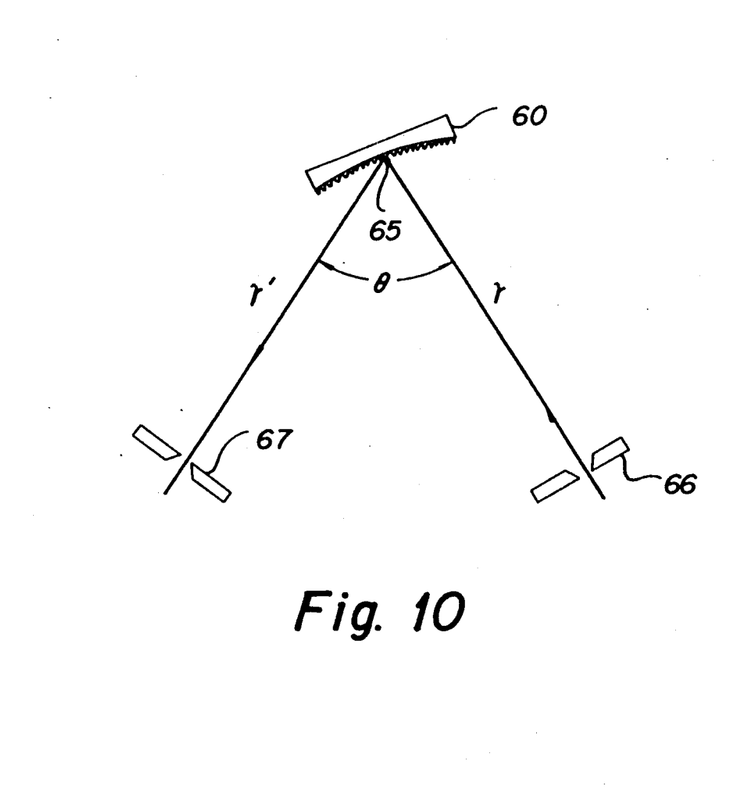
Figure 11:
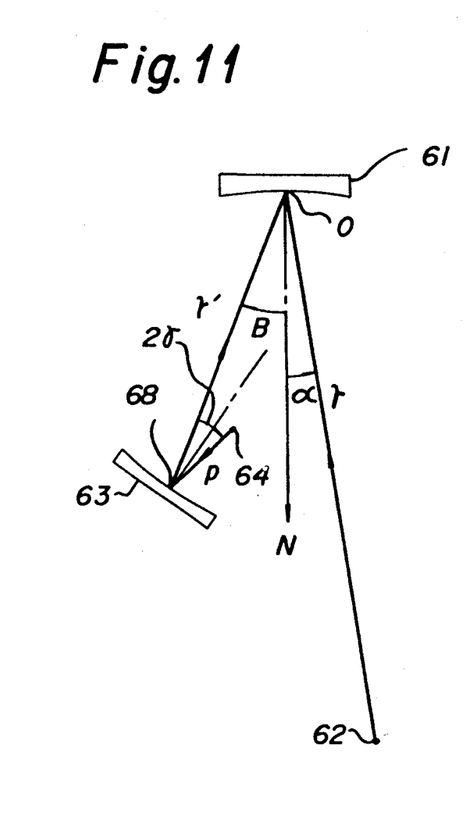
FIG. 11 shows a plan view of still more further inventive system for recording a groove pattern onto a grating substrate.
Figure 12:
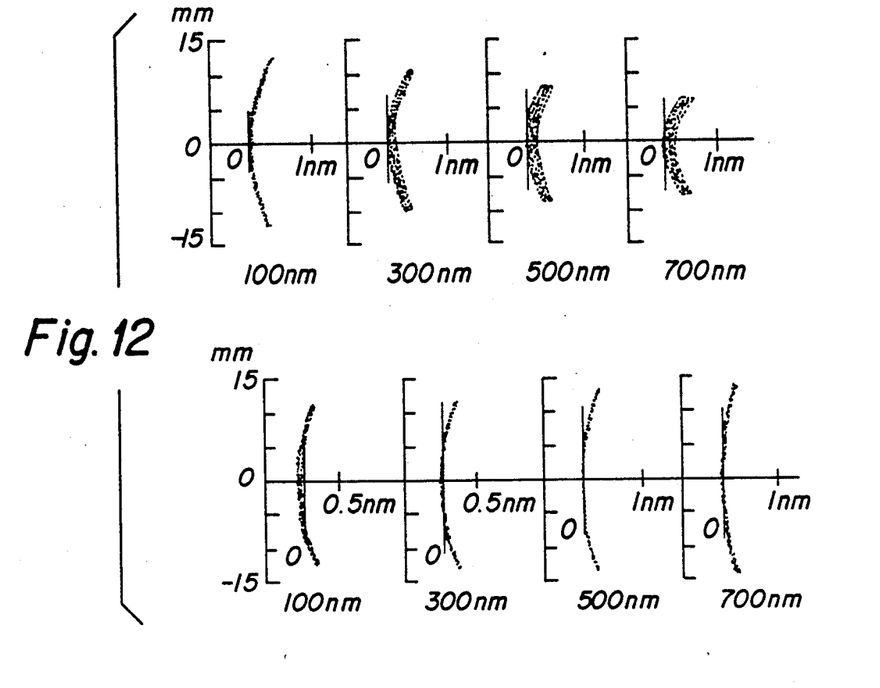
FIG. 12 illustrates other results of comparative tests for eliminating aberrations in respect to the inventive gratings as compared with conventional ones.

This embodiment relates to a Seya-Namioka mount spectroscopy system (FIG. 10) with use of an inventive, concave grating, of which the manufacture is shown in FIG. 11. FIG. 12 shows spectroscopic evaluation of aberrations in respect to the inventive and conventional gratings.

The concave grating, manufactured and applied in this embodiment, has a spherical surface of 500 mm, radius of curvature, and groove pitches of 600 lines/mm at the center of the grating. A spectroscopic system including this grating is shown in FIG. 10, wherein 66 is an entrance slit, 67 is an exit and distance (r) from the entrance slit 66 to the center 65 of the grating 60 is;

r=0.9.8374 mm and distance (r') from the grating center 65 to the exit slit 67 is; r'=410.8190 mm, and angular distance (Θ) between the entrance slit and the exit slit with respect to the grating center 65 is; θ=69.7083°, and the wavelength used is 100 to 700 nm.

FIG. 11 shows an arrangement for recording a groove pattern in the manufacture of the grating 60 wherein 61 is a spherical concave substrate having a radius of curvature=500 mm, then a normal line (N) at the grating center 0 and a plane through the normal line N are assumed and a point light source 62 is positioned at a point on the plane defined with a distance r=1999.4 mm and with an angle α=4.77° from the line N, and assuming another point on a line which angles β=11° in opposite direction from point 62 with respect to the line N and with a distance r'=871.4 mm, then a reflector mirror 63 of a spherical concave shape is positioned to fit the mirror center 68 at another point defined above, and further another light source 64 is positioned at a point on a line which angles twice of an angle (γ) defined between the line of 0 to 68 and a normal line at the reflector center 68 so as to form reflection on the center 68 (2τ=16.4°) with a distance p=204.9 mm from the center 68. Recording light used is laser of 457.93 nm wave length.

FIG. 12 shows comparative results of aberrations, noted in spot diagrams based on calculations, which are produced by the gratings of the invention in the upper half of FIG. 12 (no further compensation) and conventional gratings shown in the lower half of FIG. 12 after coma compensation, in the case of testing them with the spectroscopy of FIG. 10

Group 4

Embodiment 10

Figure 13:
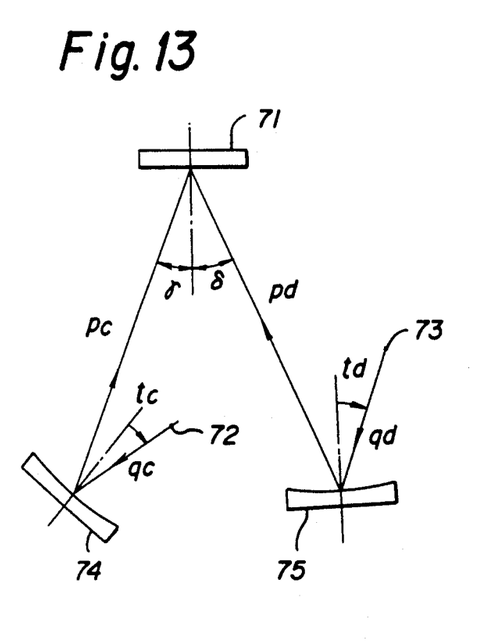
FIG. 13 shows a plan view of still additional inventive system for recording a groove pattern onto a grating substrate.

This embodiment relates to a plane grating of the invention with reference to the manufacture thereof shown in FIG. 13 and a Litrrow mount spectroscopy system (FIG. 14) with use of the grating manufactured by process shown in FIG. 13.

In FIG. 13; a substrate 71 is a plane grating 72 and 73 are recording light sources obtained by dividing the same one laser (not shown) and these two spherical dispersive beams from the sources 72, 73 are reflected by concave mirrors 74, 75 to become non-spherical and are interfered to produce fringes onto the substrate 71.

Figure 14:
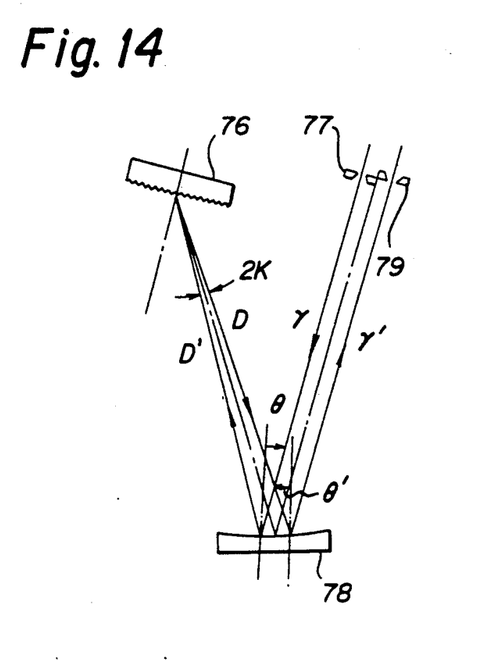
FIG. 14 shows a plan view of a spectrometer incorporating an inventive grating.

Parameters used in the Litrrow mount system of FIG. 14 are as below: wavelength is 200 nm to 800 nm, grating constant at center of the grating 76 is 1/1800 mm and a collimator 78 is assumed to have unit radius length of curvature.

Particular parameters in manufacture of the grating shown in FIG. 13 are: the laser used is of 441.6 nm wave length and

| $p_c$ = 0.3986 | $p_d$ = 0.3912 |
| $q_c$ = 0.8710 | $q_d$ = 0.8708 |
| $\tau_c$ = 6.188° | $\tau_d$ = 13.545° | and two concave reflector mirrors 74, 75 each have a radius of curvature R4, R5; R4=R5−1.000.

Parameters in the system of FIG. 14 are: r=0.4988, D=0.4078, D'=0.4093, γ'=0.4973, θ=4.290°, 2K=2.405°, θ'=5.709°; application order is −1, the collimator 78 has a radius of curvature R8, R8=1.000. Accordingly, $q_c$, $q_d$ and radii of concave mirrors 74, 75 are equal to the radius of curvature of the collimator 78 or in proximity thereof.

In the example of FIG. 13, two concave reflectors are used to reflect respective lights from the light sources 72, 73, but in similar recording systems, two concave reflectors are not always requisite and the use of the concave as either reflector may be accepted in the invention. Further, a grating substrate may take a cylindrical or spherical surface, in place of a flat plane.

CONCLUSION

As noted in the foregoing, various replacements or modifications can be introduced to the present invention by those skilled in the art without departing from the inventive spirit contained in descriptions herein, for further example, a spectrometer noted hereinabove may be a spectrophotometer or other optical device, but such should be included within the scope of the present invention.

I claim:

1. An apparatus for producing a holographic grating having a groove pattern formed thereon, comprising:
    a first means for generating and projecting a first coherent light beam onto a substrate;
    a second means for generating and projecting a second coherent light beam onto said substrate, such that the interference of said first and second coherent beams forms said groove pattern on said substrate to form said holographic grating,
    wherein said generating means of at least one of said first and second coherent light beams generates a light beam which is astigmatic and has an off-axis orientation, wherein said astigmatism has two different focal lengths in a plane defined by the center of the grating and directions of principal rays of the beams, and a plane perpendicular thereto, and wherein said off-axis orientation results from the projection of a substantially non-paraxial light beam onto an optical surface in said generating means.

2. The apparatus of claim 1, wherein said beam having said off-axis orientation results from said substantially non-paraxial beam being reflected from or transmitted through said optical surface.

3. The apparatus of claim 2, wherein said optical surface is a mirror for reflecting said substantially non-paraxial beam.

4. The apparatus of claim 1, wherein both said first and second coherent light beams are astigmatic and have an off-axis orientation.

5. A method of producing a groove pattern on a substrate to form a holographic grating, comprising the step of:
    projecting two beams of coherent light onto said substrate, wherein at least one of said beams is astigmatic and has an off-axis orientation, said astigmatism having two different focal lengths in a plane defined by a center of the grating and directions of principal rays of the beams, and in a plane perpendicular thereto, and wherein said off-axis orientation results from the projection of a substantially non-paraxial light beam onto an optical surface, such that the interference of said two beams forms said holographic grating on said substrate.

6. The method of claim 5, wherein both said first and second coherent beams are astigmatic and have an off-axis orientation.

7. The method of claim 5, wherein said astigmatic and off-axis oriented beam is formed by projecting said substantially non-paraxial light beam onto a mirror.

8. A holographic grating in an optical device, wherein said holographic grating is produced in accordance with the method set forth in claim 5.

* * * * *